Sept. 17, 1963 H. COHN ETAL 3,104,110

ACCESSORY APPARATUS FOR USE WITH PHONOGRAPH RECORD PLAYER

Original Filed Feb. 27, 1959

INVENTORS
HUGO COHN
JOSEPH L. BONANNO
BY Frederick Breitenfeld
ATTORNEY

United States Patent Office 3,104,110
Patented Sept. 17, 1963

3,104,110

ACCESSORY APPARATUS FOR USE WITH PHONOGRAPH RECORD PLAYER

Hugo Cohn, New York, N.Y., and Joseph L. Bonanno, South Orange, N.J., assignors to Dan Golenpaul Associates, New York, N.Y., a copartnership Continuation of application Ser. No. 795,981, Feb. 27, 1959. This application Mar. 26, 1962, Ser. No. 182,573
5 Claims. (Cl. 274—1)

The invention relates generally to the reproduction of sound by phonograph records, and has particular reference to an accessory electrical apparatus for producing signals at selected predetermined times during the playing of a record.

While the nature of the signals produced may be of any chosen kind, the invention contemplates the employment of a simple electrically triggered signal such as the momentary illumination of a small electric lamp.

This application for patent is a continuation of our co-pending application, Serial No. 795,981, filed February 27, 1959 (now forfeited).

A general objective of the invention is to provide a simplified accessory device which may be readily brought into operative relation to a conventional record player without requiring any special tools or skill. The signals are keyed in a predetermined manner to the musical selection or other sound recording which is being played, and may be used for a variety of educational, entertainment, or other purposes. For example, a listener to a musical recording may be alerted at predetermined time intervals to noteworthy parts of the music and may thus "follow the music" with the aid of a correlated printed commentary.

It is a more specific object of the invention to provide an apparatus, and a synchronizing system, which are unusually compact, inexpensive to manufacture, easy to use, and reliable in operation.

The proper functioning of the improved device is predicated upon the use of an auxiliary turn-table which is caused to be driven in timed relation to the movement of the record player, and an auxiliary or slave disk mounted on and keyed to the auxiliary turn-table. The slave disk is provided with a pre-formed spiral guideway along which a special stylus travels as the slave disk rotates. At predetermined intervals the stylus establishes an electric circuit which actuates the signal. Accurate synchronization is achieved by an arrangement whereby the rotative movements of the record itself are relied upon to advance the slave disk. As a result, irregularities in the speed of the turn-table of the record player, and possible slippage of the record which rests on it, are ineffective to impair the precision of the desired synchronous relation between the playing of the recording and the creation of the signals.

A characterizing feature of the apparatus resides in the provision of a simple but reliably effective means for advancing the auxiliary turn-table intermittently, there being at least one increment of movement for each complete revolution of the recording, and the parts of the device being so oriented that the signal circuit is established and maintained for at least one complete rest period of the slave disk.

Another feature of the invention which contributes to its simplicity and reliability is the manner of establishing and interrupting the signal circuit. The stylus is an electrically conductive element, and the surface of the guideway in which it moves is electrically non-conductive except at predetermined areas. These areas and the stylus are caused to be parts of the signal circuit and thus break the circuit while they are out of contact and make it possible to close the circuit when they come into contact. The desired alternation of insulating and conductive regions in the spiral guideway of the slave disk is achieved by forming this disk of a metallic element bearing on its surface a layer of insulation having perforations in it. Preferably the insulating layer is composed of a separately fabricated element of thin nonconductive plastic having the spiral guideway molded or pressed into it. An element of this kind is advantageously arranged on each of the opposite surfaces of the metal disk, the necessary connection of the metal into the signal circuit being established through the turn-table spindle upon which the slave disk rests.

Another feature of the invention resides in the design and arrangement of the parts of the apparatus in such a way that a simple flashlight battery or the like, of harmless low voltage, is adequate to activate the signal circuit and also the movements of the slave disk turntable. This contributes to the low cost of manufacture and operation, and greatly facilitates the installation and use of the accessory equipment.

Another advantageous feature of the design lies in the arrangement whereby the slave disk and signal device may if desired be positioned upon a table or other support relatively remote from the record player itself, there being in proximity to the record itself merely a small make-and-break switch of special design. This switch is so constructed that it may readily be brought into operative position relative to the edge of the recording, and retained in this position by a simple unobjectionable releasable means such as a suction-cup or magnet. The actuation of this switch by the recording is brought about by an irregularity specially imparted to the edge of the record, either in the form of a protrusion or depression. A dimensional deviation of minute and practically imperceptible magnitude is all that is required to trigger the switch, and the preferred indexing procedure is to form a simple flattening on a small part of the record edge. This does not alter the appearance of the record nor affect its mode of manufacture, and the "flat" may optionally be produced at the time of manufacture or subsequent thereto.

One way of achieving these objects and advantages in a wholly practical manner, and such other objectives and advantages as may hereinafter be pointed out, is illustrated in the accompanying drawings, in which—

Figures 1, 2, 3, 4, 5:
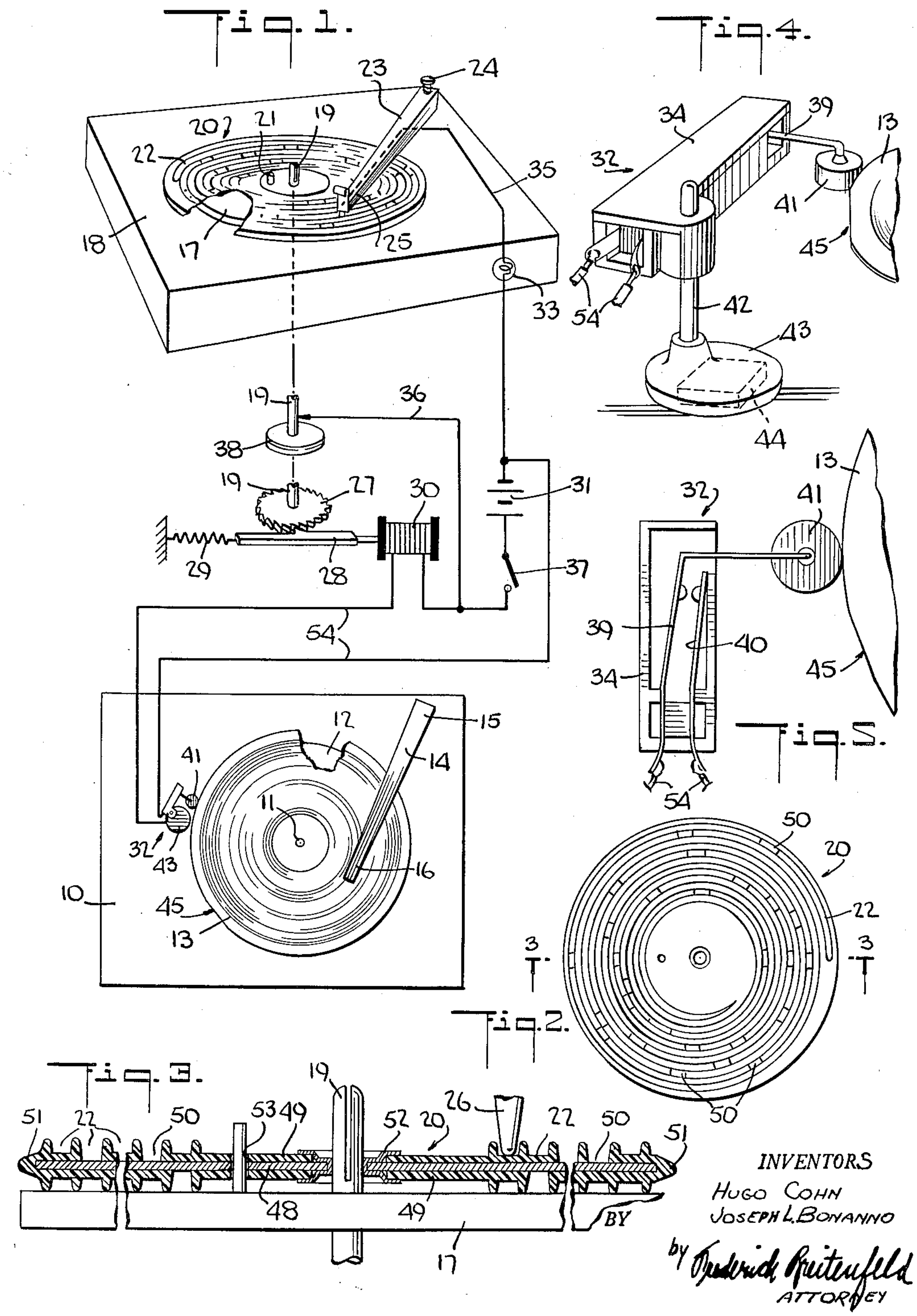
FIGURE 1 is a diagrammatic view, in exploded relation, of the elements and electric circuits which form parts of an illustrative apparatus embodying the features of the invention.
FIGURE 2 is a plan view of the slave disk by itself.
FIGURE 3 is an enlarged and somewhat exaggerated cross-sectional view showing the slave disk in operative position on its turn-table, the cross-section being along a diameter as indicated at 3—3 in FIGURE 2.
FIGURE 4 is an enlarged perspective view of the make-and-break switch in operative relation to the record which controls it.
FIGURE 5 is a plan view of the switch of FIGURE 4 with the top wall removed to reveal the switch contacts themselves.

As will be pointed out more fully hereinafter, the dimensional proportions of the parts, and their physical orientation, are represented in FIGURE 1 in a purely schematic manner.

A conventional record player 10 is indicated in plan view in FIGURE 1. Mounted on the spindle 11 of its turn-table 12 is a disk-type phonograph record 13. The pick-up arm 14 of the usual reproducing apparatus (not shown) is pivoted in well-known fashion at its end 15 and the opposite end 16 carries a needle which rides along the groove of the record as the latter rotates continuously.

The auxiliary turn-table 17 and its support 18 are shown in perspective in FIGURE 1. Mounted on the spindle 19 is a slave disk 20 of special character. It is locked against slippage on the turn-table by means of an off-center pin 21. It has a specially formed spiral guideway 22 (FIGURE 3). A pivoted arm 23, free to swing on the pivot 24 at its rear end, carries at its front end 25 an electrically conductive stylus 26 which rides in the spiral groove or guideway 22. This stylus is round and blunt and the guideway is of appreciable width, the relationship of parts being quite different from that of the phonograph needle riding in its microscopically corrugated record groove.

The spindle 19 is rotated intermittently, and one way of achieving this result is to mount a ratchet 27 on the spindle, the ratchet being driven by a pawl 28. A preferred arrangement consists in biasing the pawl 28 in the driving direction (leftward in FIGURE 1) by means of a tension spring 29, and intermittently drawing the pawl 28 in the opposite direction by a magnet coil 30.

The coil 30 is in an electric circuit which includes the battery or other power source 31 and a make-and-break switch 32. The latter is arranged adjacent to the record 13 and cooperates with the record in such a way that the switch 32 is actuated momentarily at least once during each revolution of the record 13. In the apparatus illustrated there is a single momentary actuation of the switch 32 during each revolution of the record, and the actuation consists of a closing of the switch contacts, thereby energizing the coil 30. This, in cooperation with the action of the spring 29, advances the ratchet 27 and hence the slave disk 20 through a predetermined increment of movement. Obviously, if desired, the spring and magnet action might be reversed so that a momentary separation of contacts in the switch 32 would bring about the desired action.

The battery or power source 31 also energizes a signal circuit in which there is an electrical signal 33, preferably in the form of a small electric lamp. This circuit includes the conductive stylus 26, the connection lead 35, the spindle 19 or equivalent part of the turn-table 17, and the lead 36. The slave disk is so designed that during predetermined alternate time intervals the stylus 26 and the turn-table spindle 19 are brought into and out of electrical contact, thus completing the signal circuit at selected times.

A main switch 37 is advantageously provided in the two electric circuits, as shown, to permit complete inactivation of each when the apparatus is not in use.

A slip-clutch 38 or its equivalent is provided between the ratchet 27 and the turn-table 17, so that the turn-table can be manually rotated in reverse direction during the initial setting of the slave disk into proper starting position.

The switch 32 comprises a housing 34 for the two switch contacts 39, 40, and a follower 41 carried by one of them and projecting laterally from the housing. The switch is supported in suitable fashion in adjacence to the record 13. A satisfactory way of doing this is to mount the switch housing 34 on a pedestal 42 whose base 43 is provided with means for anchoring it. In the construction illustrated in FIGURE 4, the base is provided with a magnet 44 on its under face, whereby the placement of the switch on any metallic surface, such as the top wall of the record player, will establish a stable magnetically-held relationship. If desired, a suction cup could be provided for this purpose, or the base 43 might be weighted so as to stabilize it in the desired location.

The switch follower 41 is adapted to rest lightly against the edge of the record 13, and a pre-formed irregularity in this edge is instrumental in moving the follower. While a protrusion on the record is feasible for the purpose, it is preferable to rely upon a depression since this can be formed more easily either during or after the manufacture of the record. It has been found in practice that the simple flattening of the record edge along a minute extent is adequate to impart the desired movements to the follower 41. Such a flattening is indicated at 45 in FIGURES 4 and 5. It will be observed (see FIGURE 5) that the switch contact 40 is stationary while the contact 39, which carries the follower 41, is movable. These contacts are minute in size, since the circuit in which they operate is of low voltage, and the movable contact 39 may thus be formed of a thin lightweight springy wire or the like whose inherent springiness urges it constantly toward the fixed contact 40. Since the motion required is of very slight extent (a minute fraction of an inch will suffice), and since the force required to move the element 39 is also small, the parts may be made of unusually light-weight material and the entire switch device is barely an inch long. The "flat" 45 on the record is also of small extent, no more than an inch in length, and is imperceptible to the ordinary observer.

The slave disk 20 consists essentially of an electrically conductive element adapted to establish electrical contact with the turn-table spindle 19, and a means for insulating the stylus 26 from it except at predetermined times. For this purpose, the disk may be composed of a metallic element 48 whose upper surface bears a layer of insulation, the specially formed spiral guideway 22 being formed in this layer. Openings are formed at spaced intervals along the spiral. In the preferred device, the metal disk 48 of the slave disk 20 is formed on both of its surfaces with insulating layers of this kind, whereby a single slave disk is reversible, just like the record 13 itself, and can thus service the apparatus for both sides of the record 13.

One of the important features of the invention resides in the practical manner in which the slave disk may be manufactured. The insulating layer on each face is a separately fabricated plastic element 49 formed of thin sheet material. The spiral guideway 22 is formed as an integral part of the sheet, for example by means of an appropriate die to which the sheet is subjected under pressure, with or without the aid of heat, or by molding the guideway into the sheet. At the desired intervals along the extent of the guideway (determined by a preliminary monitoring of the record 13) openings 50 are cut through the plastic sheet. The sheets 49 are larger in diameter than the metal element 48 sandwiched between them, and are marginally joined together (as indicated at 51 in FIGURE 3) by adhesive or thermoplastic merger.

The sheets 49 are preferably secured in position by adhesive interposed between them and the metal element 48, but this is not essential. At the center, the sandwiched assembly is provided with a spindle-receiving openings, and an eyelet 52 extends through it. The eyelet is metallic, and the center openings in the plastic layers 49 are so shaped that the eyelet not only engages the plastic sheets but also establishes a firm electrically conductive contact with the intermediate element 48. The assembly is also provided with an off-center opening 53 adapted to fit over the pin 21.

The spindle 19 is so formed that it will assuredly establish an electric contact with the eyelet 52 when the slave disk is mounted upon the turn-table 17. For this purpose the upper end of the spindle may be split, as shown in FIGURE 3, to allow spreading of the two halves. If desired, a compression spring or its equivalent (not shown) may be permanently mounted within the spindle in order to spread its sections apart in a yieldable manner and thus always establish a firm interengagement between the spindle 19 and the metal disk 48.

Obviously, if the turn-table 17 is itself of electrically conductive material, the off-center pin 21 might be employed for the purpose of establishing the desired circuit.

In such case it would be advantageous to mount a metallic eyelet in the opening 53 similar to the eyelet 52.

In practicing the invention, the housing 18 is of hollow construction, and the ratchet mechanism, the magnet coil 30, and the battery 31, are mounted within it. The signal lamp 33 is preferably mounted in a side wall of this housing, and the switch 37 may be mounted in some accessible position on its top wall. The lead wires 54 extending to the switch 32 may be of any desired length. Thus the major part of the auxiliary apparatus may be located at a considerable distance from the record player, and the only element brought into proximity with the record player itself is the switch 32. As hereinbefore described this is set in inconspicuous fashion alongside the record 13 with the follower 41 in lightly touching contact with the record edge.

It is thought to be obvious from the foregoing that a separate slave disk is provided for each recording to be edited. Its openings 50 will be so located that at the times when commentary or explanation is desired, the signal circuit will be completed so as to alert the listener and thereby enable him to refer to a printed commentary previously prepared for that particular recording. The openings are positioned so as to come beneath the stylus 26 during rest periods of the slave disk. In this way the signal will remain operative for a predetermined minimum period. For example, if the record 13 has a single "flat" 45 on its edge, the signal 33 will remain in operation for at least one full revolution of the record 13. Obviously, if it is thought to be desirable, the openings 50, or some of them, may be made long enough to keep the signal circuit closed during a predetermined succession of movements of the slave disk. Usually, a signal light that is kept lit for two or three revolutions of the record 13 is most effective to alert the average listener in satisfactory fashion.

The manner of use of the apparatus is as follows:

The slave disk 20 having been placed upon the auxiliary turn-table 17, the stylus 26 is set into the outermost turn of the guideway 22, and the slave disk is manually turned in reverse direction (made possible by the slippage of the clutch 38) until the stylus encounters the outer end of the guideway 22. The turn-table 12 of the record player 10 is then set into operation and at the instant when sound first emanates from the record 13 the switch 37 is manually closed. The apparatus is then properly synchronized and will function automatically throughout the playing of the record 13.

Since the auxiliary turn-table 17 advances through intermittent increments in direct dependence upon rotative movement of the record 13 itself, it follows that slippage of the record 13 on the turn-table 12, or irregularity in the speed of rotation of the turn-table, have no effect upon the desired accuracy of synchronization. Similarly, in initially monitoring the record for the purpose of placement of the openings 50 in desired locations on the slave disk 20 (prior to the manufacture of the latter) the editor can rely solely upon the sounds he hears, and is not required to specify points of interest in terms of turn-table revolutions or speed, or stop-watch time intervals, each of which is obviously variable from one record player to another.

The apparatus illustrated, and the circuits shown, have proven satisfactory in practice. The auxiliary turn-table unit is small and compact, no wider than six inches or so; the power required is ably furnished by one or a few ordinary "flashlight" batteries; the slave disks are inexpensive, light in weight, sturdy, unbreakable, and wear-resistant; and the equipment as a whole is entirely practical and reliable. It is to be understood, however, that many of the details herein described and illustrated have been furnished by way of example only, and may be modified by those skilled in the art without necessarily departing from the spirit and scope of the invention as expressed in the appended claims.

What is claimed is:

1. An accessory apparatus for use with a phonograph record player in which a phonograph record is continuously rotated, comprising a slave disk having a spiral guideway with alternately arranged control areas along its extent, a turn-table for supporting said slave disk, means for preventing relative rotation between said turn-table and said slave disk, a rotatable spindle for supporting said turn-table, electrically operated drive means for imparting intermittent movements to said spindle, a slip-clutch on said spindle for transmitting motion between said drive means and said turn-table in the direction of rotation of said drive means but not in the reverse direction, a circuit for said drive means including a pair of switch contacts, means for closing said contacts at least once during each revolution of said record so as to impart an increment of movement to said slave disk, an electric signal, a stylus riding in said guideway, and a signal circuit including said stylus, said stylus being responsive to the control areas along said guideway for alternately establishing and interrupting said signal circuit.

2. An accessory apparatus for use with a phonograph record player in which a phonograph record is continuously rotated, comprising a slave disk having a spiral guideway with alternately arranged control areas along its extent, a turn-table for supporting said slave disk, electrically operated drive means for imparting intermittent movements to said turn-table, a circuit for said drive means including a pair of engageable switch contacts, a housing for enclosing said contacts, one of said contacts being provided with a follower arranged outwardly of said housing, portable means for supporting said housing in proximity to the edge of said record, means on said edge adapted to engage said follower for closing said contacts at least once during each revolution of said record, an electric signal, a stylus riding in said guideway, and a signal circuit including said stylus, said stylus being responsive to the control areas along said guideway for alternately establishing and interrupting said signal circuit.

3. An accessory apparatus for use with a phonograph record player in which a phonograph record is continuously rotated, comprising a slave disk having a spiral guideway with alternately arranged control areas along its extent, a turn-table for supporting said slave disk, means for preventing relative rotation between said turn-table and said slave disk, a rotatable spindle for supporting said turn-table, electrically operated drive means for imparting intermittent movements to said spindle, a slip-clutch on said spindle for transmitting motion between said drive means and said turn-table in the direction of rotation of said drive means but not in the reverse direction, a circuit for said drive means including a pair of switch contacts, means for closing said contacts at least once during each revolution of said record so as to impart an increment of movement to said slave disk, an electric signal, a stylus riding in said guideway, and a signal circuit, said stylus coacting with said signal circuit and being responsive to the control areas along said guideway for alternately establishing and interrupting said signal circuit.

4. An accessory apparatus for use with a phonograph record player in which a phonograph record is continuously rotated, comprising a slave disk having a spiral guideway with alternately arranged control areas along its extent, a turn-table for supporting said slave disk, electrically operated drive means for imparting intermittent movements to said turn-table, a circuit for said drive means including a pair of engageable switch contacts, a housing for enclosing said contacts, one of said contacts being provided with a follower arranged outwardly of said housing, portable means for supporting said housing in proximity to the edge of said record, means on said edge adapted to engage said follower for closing said contacts at least once during each revolution of said record, an electric signal, a stylus riding in said guideway, and a signal circuit, said stylus coacting with said signal circuit and being responsive to the control areas along said guideway for alternately establishing and interrupting said signal circuit.

5. A slave disk of the character described, comprising a circular metal element adapted to fit on a turn-table, and a circular sheet of non-conductive material about equal in size to said metal element on each surface of said element, said sheets each having a marginal portion extending slightly beyond the edge of said element and being joined to each other, and said sheets each having a spiral guideway adapted to receive a metallic stylus and provided at intermediate points along its extent with a plurality of spaced opening through which said stylus may establish contact with said metal element.

No references cited.